JAMES H. BLESSING.

Improvement in Steam Traps.

No. 123,670. Patented Feb. 13, 1872.

No. 5,549. Reissued August 26, 1873.

*Witnesses.*
R. Campbell.
J. N. Campbell.

*Inventor.*
James H. Blessing
by
Mason, Fenwick & Lawrence

THE NORRIS PETERS CO., PHOTO-LITHO., WASHINGTON, D. C.

JAMES H. BLESSING.

Improvement in Steam Traps.

No. 123,670.
No. 5,549.

Patented Feb. 13, 1872.
Reissued August 26, 1873.

Witnesses.
R. Campbell.
Jas. H. Campbell.

Inventor
James H. Blessing
by
Mann, Brewick & Hammer

THE NORRIS PETERS CO., PHOTO-LITHO., WASHINGTON, D. C.

JAMES H. BLESSING.

Improvement in Steam Traps.

No. 123,670. Patented Feb. 13, 1872.

No. 5,549. Reissued August 26, 1873.

Witnesses.
R. J. Campbell
J. N. Campbell.

Inventor
James H. Blessing
by
Mason, Fenwick & Lawrence

THE NORRIS PETERS CO., PHOTO-LITHO., WASHINGTON, D. C.

UNITED STATES PATENT OFFICE

JAMES H. BLESSING, OF ALBANY, NEW YORK, ASSIGNOR TO HIMSELF AND FREDERICK TOWNSEND, OF SAME PLACE.

IMPROVEMENT IN STEAM-TRAPS.

Specification forming part of Letters Patent No. 123,670, dated February 13, 1872; reissue No. 5,549, dated August 26, 1873; application filed April 30, 1873.

*To all whom it may concern:*

Be it known that I, JAMES H. BLESSING, of Albany, in the county of Albany and State of New York, have invented certain Improvements in Steam-Traps; and I do hereby declare that the following is a full, clear, and exact description thereof, reference being had to the accompanying drawings making part of this specification, in which—

Figure 1:
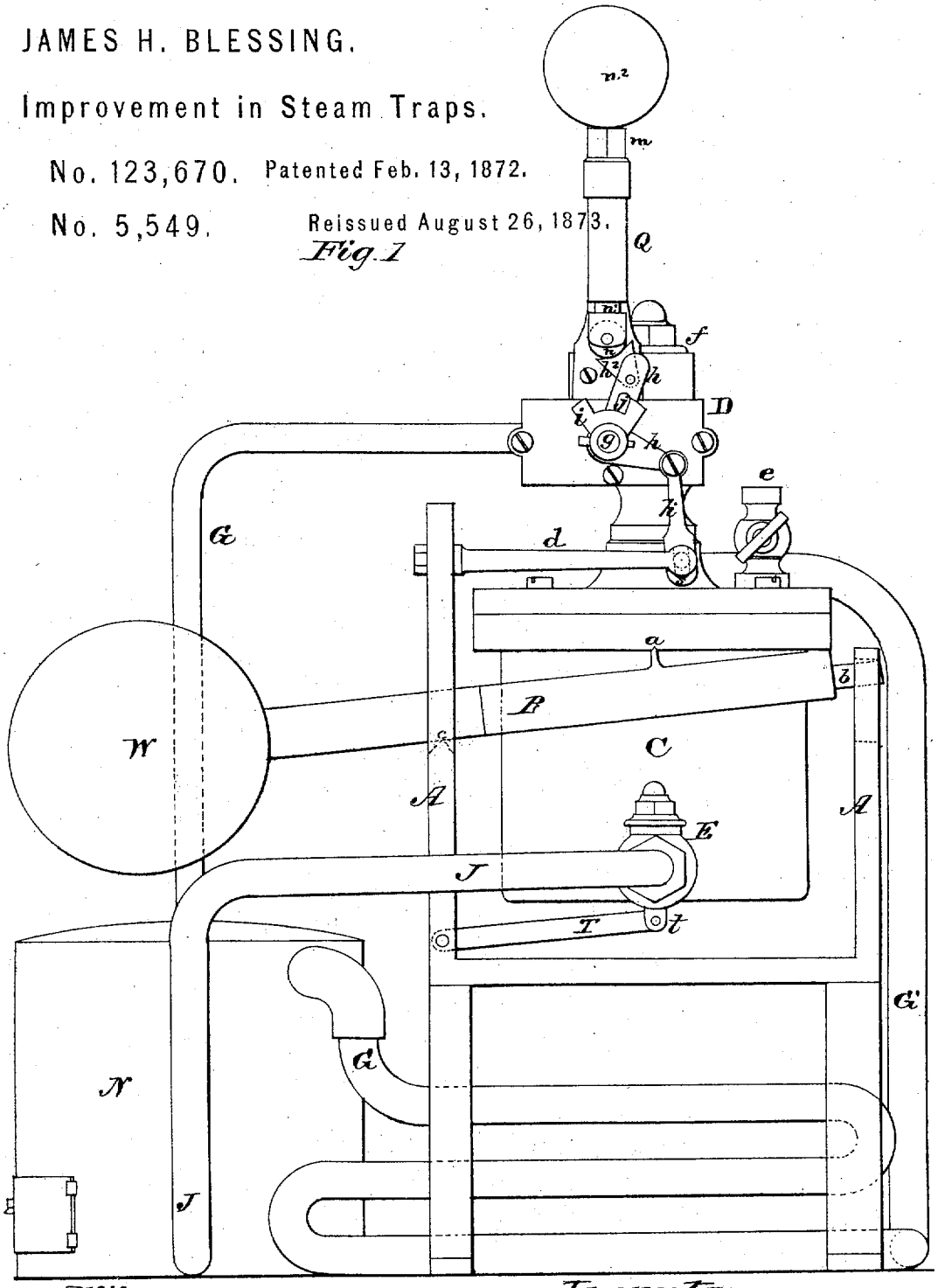
Figure 2:
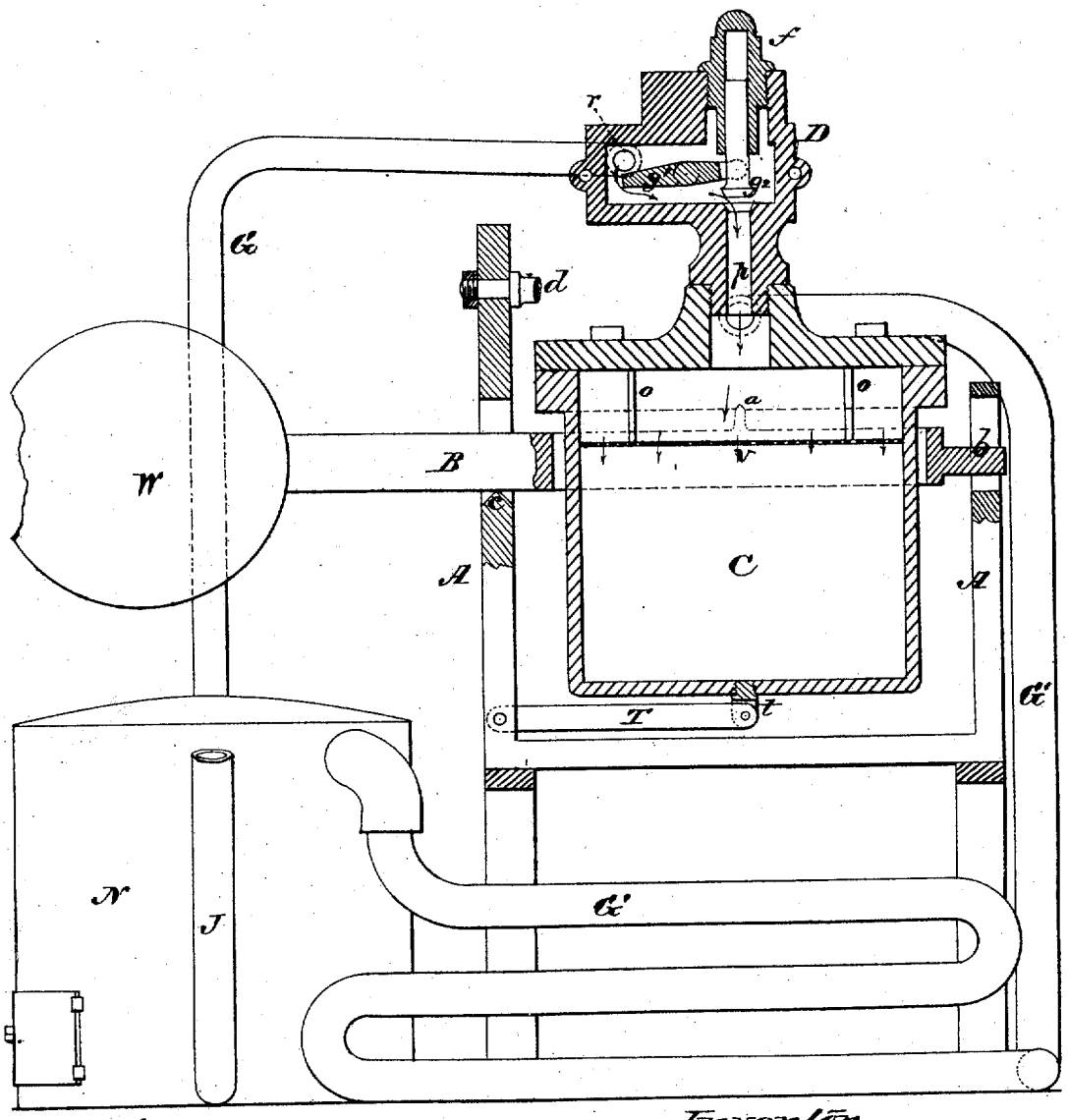
Figure 3:
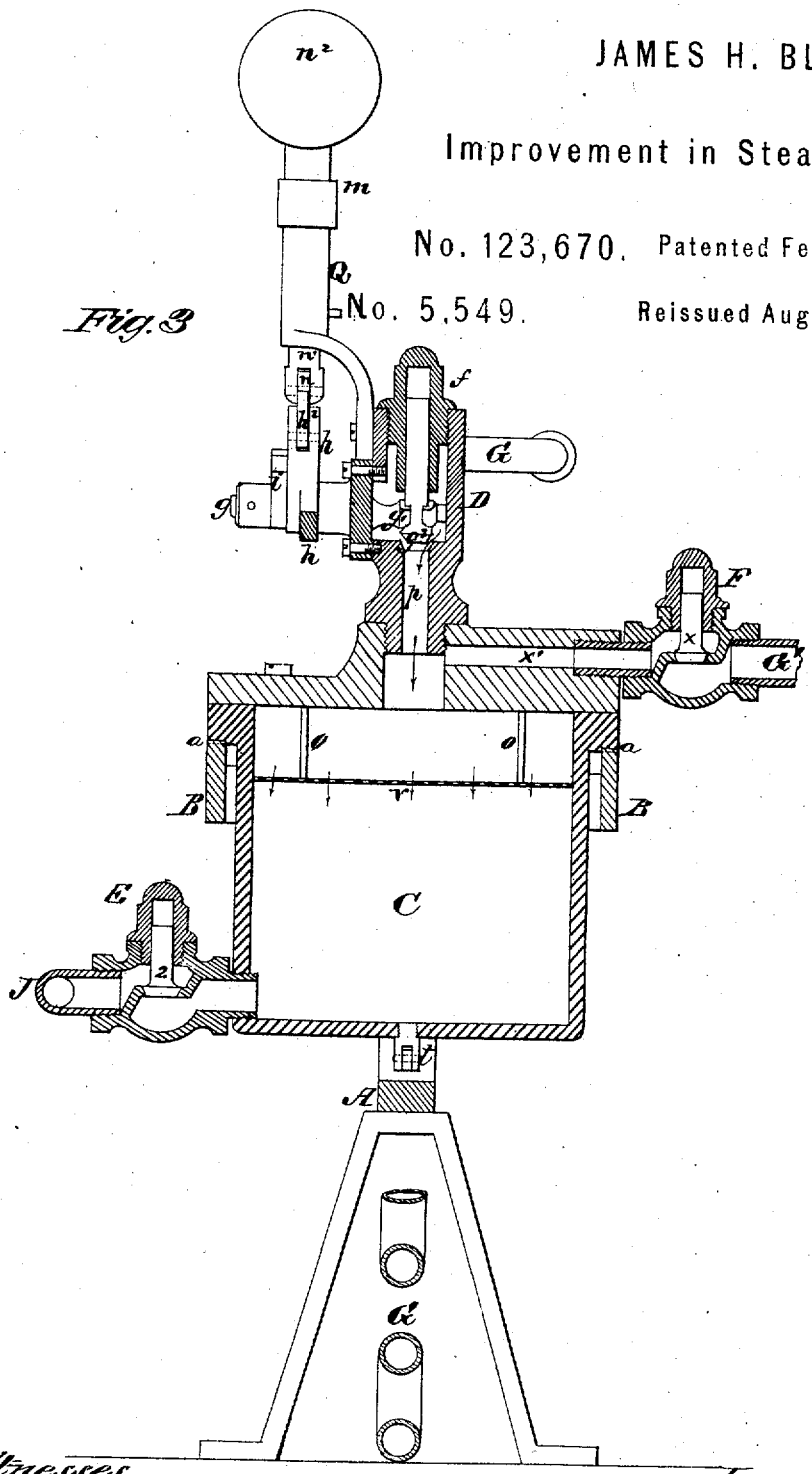

Figure 1, Plate 1, is an elevation of the improved trap and its connections with a steam-boiler. Fig. 2, Plate 2, is a vertical section taken centrally through the trap and its valve-box attachment. Fig. 3, Plate 3, is a vertical section through the trap taken in a plane at right angles to the sectional plane of Fig. 2.

Similar letters of reference indicate corresponding parts in the several figures.

The object of this invention is to prevent an undue accumulation of water of condensation in the pipes or steam-ways which are used for heating buildings and other purposes by causing the water which results from condensation of the steam in the heaters to be forced back into the boiler, as will be hereinafter explained.

The following description of my invention will enable others skilled in the art to understand it.

In the accompanying drawings, Figs. 1 and 2, I have represented a steam-boiler, N, in connection with my improved trap, for the purpose of showing the tubular connections between the trap and boiler without regard to the relative proportions of said parts or the arrangement thereof. C represents a vessel of any suitable capacity, which is adapted for receiving the water of condensation from the heating-pipes and retaining the water until it is discharged into the boiler. This vessel C is arranged above the highest water-level of the steam-boiler N, and it communicates with this boiler by means of pipes G′ and J. The pipe G′ leads out of the steam-space of the boiler, and enters the upper part of the vessel C by means of a valve-box, F, in which is a valve, $x$, opening upward. In Fig. 3 the valve-box F is represented as communicating with the interior of the vessel C through a passage, $x'$. The pipe J communicates with the lower portion of the vessel C by means of a valve-box, E, in which is a valve, 2, opening upward. The lower end of the pipe J communicates with the boiler N below the lowest water-line. $e$ is an air blow-off cock communicating with the interior of vessel C. V is a perforated distributing plate or diaphragm suspended within the vessel C by rods pendent from its top. This plate facilitates condensation of the steam, which is introduced into the vessel for the purpose of equalizing the pressure by causing a diffusion of the water of condensation, which flows into the vessel C. This plate also serves to prevent the steam which is introduced for equalizing the pressures passing in a direct line down into the water, it insuring a diffusion over the whole surface of the water in the vessel C, and thereby establishing the desired pressure instantly. The vessel C is mounted on knife-edge bearings $a$ $a$, which rise from the yoked portion of a lever, B, that has its fulcrum at $c$ on one upright arm of a frame, A. The longest arm of lever B is provided with an adjustable counterbalancing-weight, W, which keeps the vessel C in the elevated position shown in Fig. 1, except when a sufficient quantity of the water of condensation accumulates in it to overcome said weight. Then this vessel will assume the position indicated in Fig. 2 until the water escapes from it into the boiler. An extension, $b$, of the lever B works in a vertical slot in the frame A and limits the extent of vibration of this lever; and a rod, T, which is pivoted to the frame A at one end and to a lug, $b$, in the center of the bottom of the vessel C at the other end, serves to steady this vessel in its up-and-down movements. Through the head of the vessel C is a passage, $p$, which communicates with the interior of a valve-box, D, which is secured rigidly to this head. The valve-box D is quadrangular in form, and is provided interiorly with a valve, $g^2$, which has its seat at the upper terminus of the passage $p$, and which is formed on the lower end of a vertical stem that plays in and is guided by a screw-cap, $f$. The valve-stem is notched, and at this notched point it is embraced by the bifurcated end of a trip, $g^1$, which is formed on a horizontal oscillating shaft, $g$. This shaft $g$ extends through one side of the valve-box D, and receives upon it, outside of the box D, an angular lever, $h$, and a forked segment, $i$. The angular lever $h$ is connected, by its lower arm, to a fixed arm, $d$, by means of a rod, $h^1$, the lower end of which is slotted. The upper arm of the lever $h$ is provided with a tumbler, $h^2$, on the concave surface of which a loaded rod, $n^1$, is supported by means of an anti-friction roller, $n$. The rod $n^1$ is guided in its vertical movements by means of the tubular portion of a bracket, Q, which is fixed to the valve-box D, and the weight $n^2$ on the upper end of this rod $n^1$ is adjustable, and can be fixed at the desired point by means of the shouldered nut $m$, shown in Figs. 1 and 3. In front of the angular lever $h$ is the forked segment $i$, between the ends of which plays a lug, $j$, on the upper arm of this lever $h$.

When the parts just described are properly adjusted with relation to the length of strokes of the vessel C, and this vessel is caused to descend by an accumulation of water in it sufficient to overcome the weight of the ball W, the upper arm of the lever $h$ will be forced over to the left-hand side of a vertical plane intersecting the axis of the shaft $g$, and will, by means of the lug $j$ and segment $i$, lift the valve $g^2$. When the weight W again preponderates by the escape of water from the vessel C, the latter will rise, and, by the mechanism above described, the valve $g^2$ will be shut. The strokes of the vessel C will only move the upper arm of lever $h$ past the center of shaft $g$ slowly; but, by having a slot in rod $h^1$ and using the loaded rod $n^1$, lug $j$, and segment $i$, the weight $n^2$ is caused to act quickly upon the valve $g^2$ at the termini of the strokes of the vessel C. By means of a pipe, G, which leads from the steam-space of the steam-boiler into the valve-box at $r$, steam is supplied to the valve-box D.

I will now describe the operation of the trap: Steam being let into coils or heaters, represented by pipe G′, and all the air driven out of the vessel C through the cock $e$, or by blowing off through the usual blow-off valve at the boiler of steam-heating apparatus, water will begin to accumulate in the lowest parts of the pipe G′, the effect of which will be to allow the steam between and in the vessel C and that portion of the pipe G′ containing said accumulated water to condense more or less. This will produce a partial vacuum in vessel C, and cause the pressure of steam from the boiler and in the heaters to force the said accumulated water through the check-valve $x$ and passage $x'$ into the receiver, the highly-heated steam following behind it into the vessel C, and thus heating the pipe G′ and vessel C to a temperature and pressure nearly equal to that in the pipe J and boiler N. This condition of things taking place, the boiler-pressure is counterbalanced, and the water, by its gravity, descends through valve-box E and lifts the valve 2 and passes through pipe J into the boiler. This operation or circulation will continue as long as an equilibrium of pressure can be maintained between the vessel C and the boiler through the drip-pipe J, and should it cease at any time it can be started again by blowing off. The trap operates in the manner described so long as there is an equilibrium of pressure; but at times the vessel C, on account of the equilibrium of pressure not being maintained throughout the heaters, becomes so surcharged with water that it, by the weight of the water therein, descends, as indicated in Fig. 2, and opens the valve $g^2$ in valve-box D, thus establishing a communication between the steam-space in the boiler N and the interior of the vessel C through the pipe G and passage $p$. This allows the water which had accumulated in the vessel C to descend into the boiler through drip-pipe J and its discharge-valve 2. The vessel C is now only filled with steam corresponding in pressure with that in the boiler, and as this steam is lighter than the water which was expelled from the vessel the weight W instantly causes the vessel to rise and shut the valve $g^2$, thereby cutting off the boiler-pressure in the vessel C through the pipe G. In a few seconds condensation reduces the steam in the trap to water, and thus a partial vacuum is formed, and the water of condensation in the heating-coils again flows or is forced into the vessel C through valve-box F, and from thence is forced directly into the boiler, if an equilibrium is established, or perodically, as the circumstances of the case may be.

It should be understood that in first starting the heating-coils the water from condensation in them is cold as it enters the vessel C, and therefore it quickly condenses the steam left in the vessel C′ from a previous movement thereof, and produces instantaneously so much of a vacuum that it causes the water of condensation to flow into the vessel C with great rapidity, and the vessel itself to move with greater speed than is subsequently the case. After the trap has worked for a time the coil becomes highly heated, and, the water of condensation being of much higher temperature than at first, and steam being mixed with it as it flows through the valve-box F, the vessel C does not move so rapidly as condensation is retarded. After working a still longer time, the water being entirely drawn from the heating-coils, steam alone enters the vessel C, and an equilibrium of pressure is produced, and the trap ceases to move until, through condensation in the vessel C and heating-coils, this equilibrium is destroyed, when the water of condensation again flows into the vessel C, and the vessel C continues to repeat its movements automatically, in accordance with the rapidity of condensation.

The vessel C may be either cylindrical, spherical, or of any other suitable form. When it is of a spherical form it may be applied without any material change in the construction of the supports, and the pivoted rod T may be dispensed with.

From the foregoing description it is evident that, when the trap has worked off the condensed water, (which it does in a very short time,) a perfect circulation will commence and be kept up without any ascending or descending movement of the vessel occurring, the check-valves only working. This is due, I think, to the following: The water of condensation being all worked off, the steam in the coils and that in the vessel C, after the last operation, are very nearly, if not quite, of the same temperature; a few moments elapse, when the temperature of the steam in the vessel C falls below that in the coils, when the few drops, more or less, of water gained from condensation in the coils reach the vessel C accompanied by the high steam behind it, which is, say, very nearly the boiler-pressure, or so near the same that the addition of the weight of the water to it counterbalances the boiler-pressure, and allows the water to descend into the boiler. I have observed that this circulation in the manner stated continues, where the pressure in the boiler, coils, and vessel is maintained about the same, for two or three hours together, the drip-pipe and discharge-pipe continuing very hot, and about the same temperature. It follows, therefore, that my trap is not dependent in the main for its utility upon the automatic tripping device, but performs the operation of passing the water of condensation back into the boiler independently of the same after the first quantity of such water is disposed of.

The automatic valve opening and closing device is a very important auxiliary to my trap; but I regard it as only a second feature of invention, whereby the circulation from and to the boiler, if under any circumstances it is stopped by an undue quantity of water of condensation passing into the vessel C, may be automatically and quickly restored by the bringing into action of the gravitating principle of the vessel C, and employing the direct pressure of the steam from the boiler for expelling the water from said vessel, and then restoring the circulation by suddenly condensing the expelling steam and creating a partial vacuum in the vessel.

Having described my invention, what I claim as new, and desire to secure by Letters Patent, is—

1. A receiving and discharging vessel, C, communicating with a steam-boiler by means of a steam-pipe, G′, and inlet check-valve $x$, and with the same boiler by means of an outlet-pipe, J, and a valve, 2, and so arranged between or in respect to the two valves that the water is received and allowed to fall to the bottom of the vessel, and the steam following is not compelled to pass through the water, all for the purpose of automatically returning water of condensation to the said boiler from steam-heaters, substantially as described.

2. A vessel, C, of a steam-trap, which is sustained upon one arm of a lever, B, and counterbalanced by a weight, W, on the opposite arm of such lever, in combination with pipes G, G′, and J, and an automatic tripping device for the valve $g^2$, substantially as described.

3. A vessel, C, valve-box D, and a valve-tripping device, which is connected by a rod, $h^1$, to a fixed arm, $d$, whereby the rising and descending movements of the trap will actuate the valve $g^2$, substantially as described.

4. The perforated distributing-plate V, placed inside of the vessel C, and combined with the inlet-steam passage $p$ and water-passage $x'$ of the trap, substantially as described.

5. A receiving-vessel, C, for the purpose of insuring the return of the water of condensation to the boiler, which rises and falls on occasions, combined with a steam-heater and a steam-boiler, substantially as set forth.

JAMES HENRY BLESSING.

Witnesses:

A. P. STEVENS,

M. J. POWERS.